(12) United States Patent
Dodge et al.

(10) Patent No.: US 7,274,000 B2
(45) Date of Patent: Sep. 25, 2007

(54) POWER SOURCE FOR HIGH CURRENT WELDING

(75) Inventors: Robert L. Dodge, Mentor, OH (US); Todd E. Kooken, University Hts., OH (US)

(73) Assignee: Lincoln Global, Inc., City of Industry, CA (US)

( * ) Notice: Subject to any disclaimer, the term of this patent is extended or adjusted under 35 U.S.C. 154(b) by 478 days.

(21) Appl. No.: 10/873,771

(22) Filed: Jun. 22, 2004

(65) Prior Publication Data

US 2005/0006367 A1    Jan. 13, 2005

Related U.S. Application Data

(63) Continuation-in-part of application No. 10/617,236, filed on Jul. 11, 2003, now Pat. No. 6,998,573.

(51) Int. Cl.
 *B23K 9/10* (2006.01)
(52) U.S. Cl. .................................. 219/130.1
(58) Field of Classification Search ............. 219/130.1, 219/130.31, 130.32, 130.33, 130.51, 137 PS, 219/130.21
See application file for complete search history.

(56) References Cited

U.S. PATENT DOCUMENTS

| | | | |
|---|---|---|---|
| 2,600,057 A | 6/1952 | Kerns | |
| 2,719,275 A | 9/1955 | Hartmann | |
| 3,004,135 A | 10/1961 | Diener et al. | |
| 4,338,657 A | 7/1982 | Lisin et al. | |
| 4,839,616 A | 6/1989 | Herzog | |
| 4,942,353 A | 7/1990 | Herbert | |
| 5,023,423 A | 6/1991 | Tsujii et al. | |
| 5,272,313 A * | 12/1993 | Karino et al. | ......... 219/130.21 |
| 5,341,280 A | 8/1994 | Divan et al. | |
| 5,349,157 A | 9/1994 | Blankenship | |
| 5,351,175 A | 9/1994 | Blankenship | |
| 5,406,051 A | 4/1995 | Lai | |
| 5,601,741 A | 2/1997 | Thommes | |
| 5,737,211 A | 4/1998 | Hirai et al. | |
| 5,991,169 A | 11/1999 | Kooken | |
| 5,999,078 A | 12/1999 | Herbert | |
| 6,051,810 A | 4/2000 | Stava | |

(Continued)

FOREIGN PATENT DOCUMENTS

DE    1 091 665    10/1960

(Continued)

OTHER PUBLICATIONS

Taylor Lyman, editor, Metals Handbook, 8th edition, vol. 6, "Welding and Brazing", 1971, p. 50.*

(Continued)

*Primary Examiner*—Clifford C. Shaw
(74) *Attorney, Agent, or Firm*—Fay Sharpe LLP

(57) ABSTRACT

An inverter based power source for electric arc welding where the power source includes a high switching speed inverter for driving the primary side of an output transformer that has a primary circuit with current greater than 250 amperes and a secondary circuit with a current having an operating range with a maximum current greater than 700 amperes and an output rectifier to rectify the secondary current into a DC current suitable for welding.

81 Claims, 13 Drawing Sheets

U.S. PATENT DOCUMENTS

| | | |
|---|---|---|
| 6,055,161 A | 4/2000 | Church |
| 6,111,216 A | 8/2000 | Stava |
| 6,278,080 B1 | 8/2001 | Moriguchi |
| 6,291,798 B1 | 9/2001 | Stava |
| 6,365,874 B1 | 4/2002 | Stava |
| 6,549,441 B1 * | 4/2003 | Aigner et al. .......... 219/130.21 |
| 6,660,966 B2 | 12/2003 | Houston |
| 6,665,183 B1 | 12/2003 | Shikata et al. |
| 6,717,107 B1 | 4/2004 | Hsu |
| 6,734,778 B2 | 5/2004 | Herbert |
| 2002/0056708 A1 * | 5/2002 | Moriguchi et al. .... 219/130.21 |
| 2002/0075119 A1 | 6/2002 | Herbert |

FOREIGN PATENT DOCUMENTS

| | | |
|---|---|---|
| EP | 0 601 225 A1 | 12/1992 |
| EP | 1 496 527 A1 | 1/2005 |
| GB | 1 385 867 | 3/1972 |

OTHER PUBLICATIONS

European Search Report, EP 04 02 9786, Munich, Sep. 14, 2005, Caubet, J-S.

* cited by examiner

POWER SOURCE FOR HIGH CURRENT WELDING

This application is a continuation-in-part application of prior application Ser. No. 10/617,236, filed Jul. 11, 2003 now U.S. Pat. No. 6,998,573.

The present invention relates to the art of electric arc welding and more particularly to a switching inverter based power source wherein the inverter is capable of generating a welding current heretofore unobtainable in an inverter based power source for welding or any other use.

BACKGROUND OF INVENTION

The invention is directed to a power source especially designed for electric arc welding using submerged arc technology. This type of welding operation requires extremely high welding currents, often in excess of 1000 amperes. Consequently, a power source for this use has generally involved robust transformer based input power supplies. In recent years, the welding industry has gradually transitioned to high switching speed inverters that have better welding performance, more accurate waveform control and smaller weight than bulky, high power transformer based power supplies. High switching speed inverters involve a series of paired switches for directing current in opposite directions through the primary of an output transformer. The secondary of the transformer is connected to an output rectifier so the output signal of the inverter based power source is generally a DC voltage. Consequently, a DC voltage to the high switching speed inverter is converted to a DC output by use of an output transformer and an output rectifier. This has been standard technology for the welding industry since the early 1990's and has been the subject of many patents for inverter power sources designed for use in welding. Blankenship U.S. Pat. No. 5,349,157; Blankenship U.S. Pat. No. 5,351,175; Lai U.S. Pat. No. 5,406,051; Thommes U.S. Pat. No. 5,601,741; Kooken U.S. Pat. No. 5,991,169; Stava U.S. Pat. No. 6,051,810; Church U.S. Pat. No. 6,055,161; and Morguichi U.S. Pat. No. 6,278,080 are all examples of inverters using an output transformer and rectifier as now used extensively in the electric arc welding field. These patents are incorporated by reference herein as background technology showing the type of high switching speed inverter based power sources to which the invention is directed. The origin of this type of high efficiency power source is low power circuits developed many years ago for lighting and other fixed loads, where the output current is quite low, such as less than 10 amperes. Through the years the welding industry has converted existing low current, high speed inverter based power sources into welding power sources with output currents in the general range of 200-300 amperes. The conversion of low capacity power sources into power sources capable of creating output currents necessary for welding involved development work generated at great expense over several years. This development work has resulted in inverter based power sources designed for electric arc welding that have high output current capabilities within maximum currents of 500-600 amperes. Indeed, The Lincoln Electric Company of Cleveland, Ohio has marketed an inverter based power source for electric arc welding having an output current capacity in the general range of 500-600 amperes. This has been the maximum current capability of the high efficiency power sources based upon high speed switching inverters with output AC transformers. Higher currents could not be obtained economically. Consequently, these inverters were not capable of use by themselves in high current welding operations, such as submerged arc for heavy pipe welding in a pipe mill. Such submerged arc welding in a pipe mill often involved the use of several tandem electrodes with each electrode requiring at least about 1,000 amperes of current, whether AC current or DC current. Consequently, inverter based power sources could not be used for submerged arc welding in a pipe mill, since each one of the tandem electrodes required at least about 1,000 amperes of welding current. The Lincoln Electric Company solved this problem by using several inverters for each electrode in the submerged arc welding operation. This technology is generally disclosed in Stava U.S. Pat. No. 6,291,798 incorporated by reference herein. This combining of several inverters allowed the pipe industry to use the high efficiency inverter based power sources in submerged arc welding of pipe sections; however, it required one or more separate power source for each electrode. This was an expensive proposition, but did have substantial advantages over other types of power sources based upon sinusoidal input transformer power supplies. Stava U.S. Pat. No. 6,291,798 is incorporated by reference to show one scheme to accomplish high current with a low current inverter based power sources. Several low current inverters connected together to accomplish high output currents are disclosed in Stava U.S. Pat. No. 6,365,874 directed to a circuit referred to as an inverter, but it is not the type of circuit to which the invention is directed. In Stava U.S. Pat. No. 6,365,874 a high capacity input transformer and rectifier produces a DC voltage which is alternately switched across the welding operation to produce an AC welding current. This patent is different from the type of inverter developed for electric arc welding, but does show the concept of using several inverters to obtain high output current. This type circuit replaces the transformer based power source for submerged arc welding. This patent is incorporated by reference herein as background information. The type of circuit shown in Stava U.S. Pat. No. 6,365,874 can be converted into a use of an inverter of the type to which the present invention is directed where the AC output current is developed by an inverter. This output concept is shown in Stava U.S. Pat. No. 6,111,216 where no specific inverter is disclosed. This patent is incorporated by reference. It discloses the concept of using an undefined inverter for AC electric arc welding wherein, irrespective of the inverter current, the high current at the polarity reversal points is reduced to decrease the required size of an output polarity switch shown in Stava U.S. Pat. No. 6,111,216 and also in Stava U.S. Pat. No. 6,365,874. These two patents are incorporated by reference as background information since when using AC output current the present invention anticipates implementation of the invention disclosed and claimed in Stava U.S. Pat. No. 6,111,216 to control the switching of the output current. However, this patent is conceptional as to the output switching concept, but not to any type of inverter detail.

The present invention is directed to a high switching speed inverter having an output transformer with a secondary rectified to produce the desired output DC voltage available for electric arc welding. In the last ten years the power sources of this type have been modified and developed to be used for electric arc welding. The present invention involves a further development in this type of power source to take the next step of essentially doubling the output current capabilities of a single inverter based power source. The invention involves several changes in the power source, one of which is the use of a matrix transformer at the output of the power source, which transformer utilizes a novel module concept allowing high current transfer from the primary to the secondary of the output transformer in the power source. The actual electrical circuit for the transformer can vary; however, a representative transformer circuit is shown in Blankenship U.S. Pat. No. 5,351,175 incorporated by reference herein as background information. The transformer modules are assemblies which form the secondary of a transformer, wherein the primary is interleaved through the modules. More than one module is used in a matrix transformer. This technology is well known and is shown in Herbert U.S. Pat. No. 4,942,353 which is incorporated herein so that disclosure of the matrix transformer technology need not be repeated. In Herbert U.S. Pat. No. 5,999,078 two adjacent magnetic cores are provided with secondary windings and primary windings wherein each module includes a half turn of the secondary winding. These modules merely provide a flat conductive strip through a core to be connected as a part of a secondary winding. The primary winding is then interleaved through the modules in accordance with standard matrix transformer technology. A similar module having several turns in a given core is shown in Herbert U.S. Pat. No. 6,734,778. These patents are incorporated herein to show prior art technology regarding modules used for a secondary winding in a matrix type transformer.

THE INVENTION

Modifications have been made in a standard inverter based power source used for high capacity electric arc welding, which modified power source can be used for DC or AC welding having an output welding current in excess of 700 amperes and specifically about 1000 amperes. The basic modification is a novel coaxial module used in parallel as the secondary of the output transformer to allow high current transfer of welding current through the transformer. Furthermore, the input of the power source is connected to a three phase line current having a voltage in excess of 400 volts. Thus, input energy to the rectifier and power factor correcting input stage, which is normally a passive circuit but may be an active circuit, is a relative high voltage and has extremely high currents in excess of 250 amperes, preferably 300-350 amperes. Thus, the inverter stage of the power source is converted to using switches having current capacities in excess of 250 amperes so that the current flow to the primary of the output transformer is 250-300 amperes. By implementing the novel coaxial modules for the output transformer, secondary current is generally 1,000 amperes. The current level has been designed and is alluded to as the definition of high current since this type of current is needed for submerged arc welding. Designing an inverter based power source that can obtain this desired current level is a novel concept. Obtaining an output current of over 700 amperes drastically increases the output current of an inverter based power source over any output currents previously available in the welding industry.

In accordance with the present invention there is provided a power source for electric arc welding. The power source includes a high switching speed inverter for driving the primary side of an output transformer, wherein the primary circuit of the transformer is operated at current greater than 250 amperes and the secondary circuit of the transformer is operated at a range of currents with a maximum current greater than 700 amperes. The inverter uses pulse width modulation of the paired switches under control of a pulse width modulator directed by a controller using waveform technology. The power source includes an output rectifier to rectify the secondary current into DC voltage suitable for electric arc welding.

In accordance with another aspect of the present invention there is provided a method of submerged arc welding, which method comprises rectifying a power supply having a three phase voltage over 400 VAC to obtain a DC signal, power factor correcting the DC signal into a DC bus with a voltage level greater than 400 VDC, inverting the DC bus into an AC signal with a maximum current level over 250 amperes by high speed switching the DC bus, transferring the AC signal into a welding maximum current level greater than 700 amperes, connecting the welding current to a submerged arc electrode and moving the electrode along the path. This method is selectively operated either DC current or AC current. When operated in AC current mode, the current level of the inverting act is reduced prior to each polarity reversal of the AC current as taught in Stava U.S. Pat. No. 6,111,216. This patent relates to a general switch concept and not to a particular type of inverter.

The primary object of the present invention is the provision of an inverter based power source using pulse width modulation and having an output transformer and rectifier which power source is designed to obtain a welding current greater than 700 amperes, a level previously unobtainable.

Still a further object of the present invention is the provision of a power source, as defined above, which power source comprises coaxial, module secondary windings for the inverter output transformer to allow conversion from about 300 amperes on the primary side of the output transformer to upwards of about 1,000 amperes on the secondary side of the output transformer.

Yet another object of the present invention is the provision of a method of submerged arc welding which method involves the development of at least about 700 amperes welding current for use in the welding operation. This method can be used in DC or AC MIG welding with an electrode exceeding 0.09 inches in diameter.

These and other objects and advantages will become apparent from the following description taken together with the accompanying drawings.

PREFERRED EMBODIMENT

Figures 1, 1A:
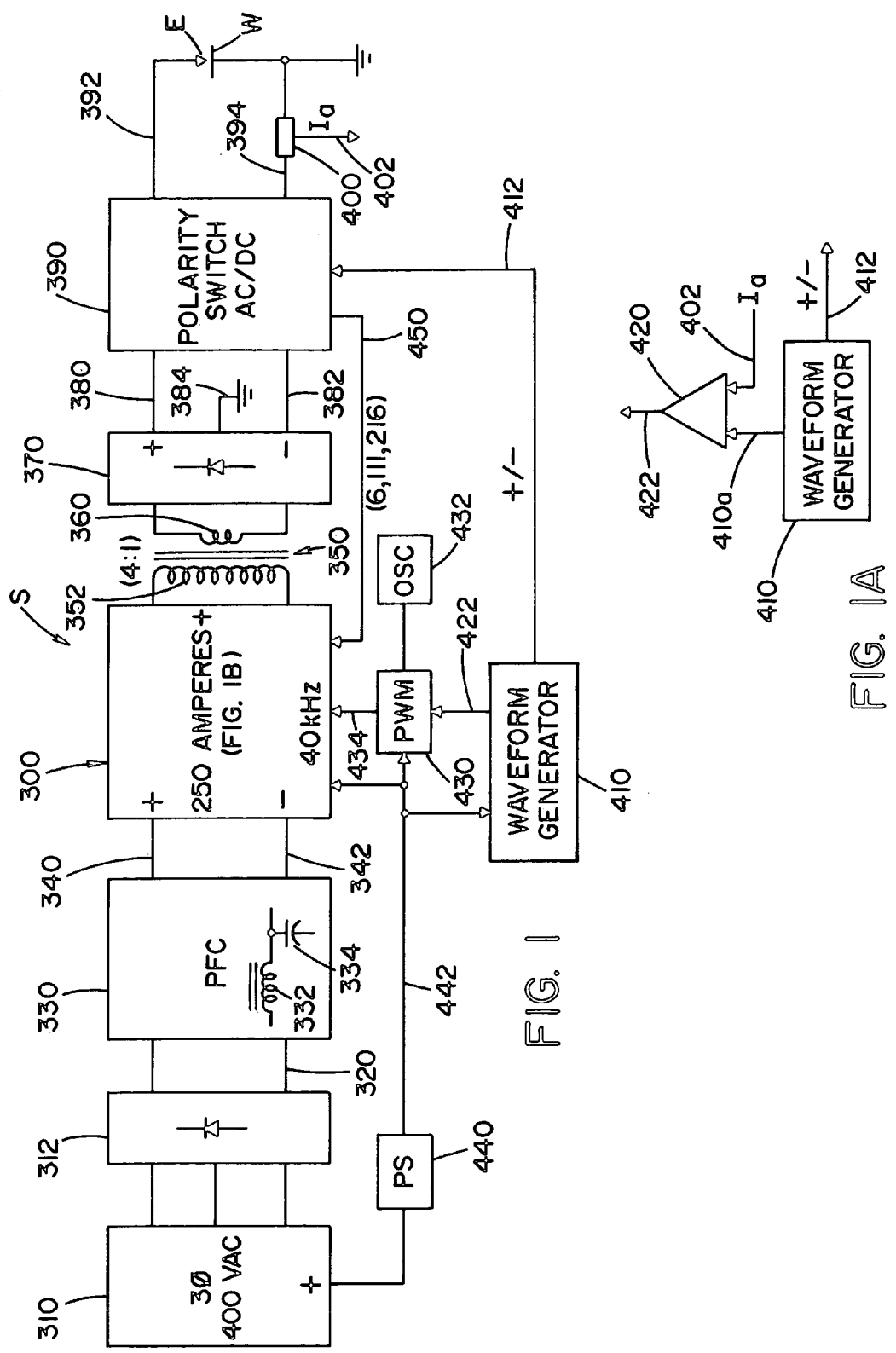
FIG. 1 is a block diagram illustrating a preferred embodiment of the present invention.
FIG. 1A is a partial logic diagram of the waveform technology control scheme used in the preferred embodiment of the present invention.
Figure 1B:
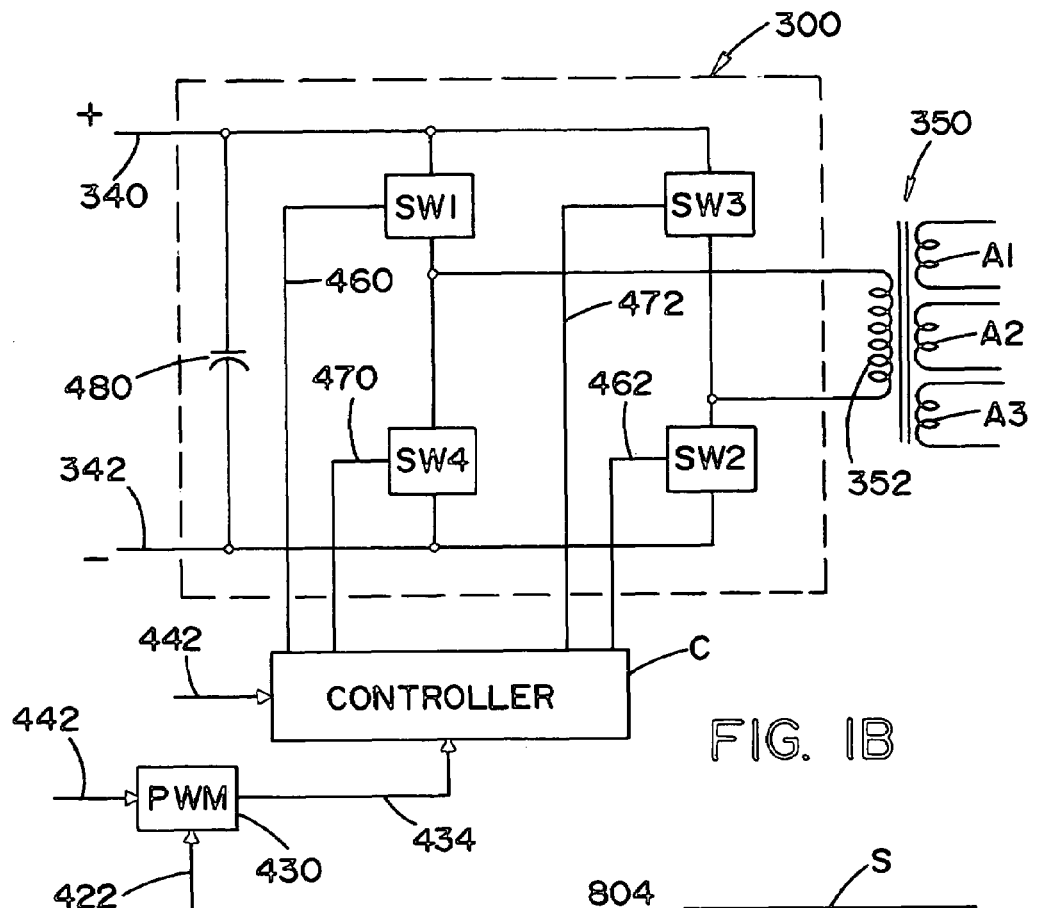
FIG. 1B is a schematic wiring diagram of the high switching speed inverter stage and novel output transformer used in the preferred embodiment of the present invention.

The present invention relates to a power source S for electric arc welding across the gap between an electrode E and workpiece W, wherein the power source includes a high switching speed inverter 300 operated at a switching frequency in the general range of 40 kHz with switches having a capacity of over 250 amperes. Details of the preferred inverter 300 are shown in FIG. 1B for the power source S as shown in FIG. 1. The control architecture of the embodiment is schematically illustrated in FIG. 1A. Referring now to the preferred embodiment of power source S, the input stage of the power source is a three phase line current with a voltage is in excess of 400 volts AC. The three phase power source 310 is rectified by rectifier 312 to produce a DC signal in lines 320, which DC signal is directed to the input side of a standard power factor correcting stage or circuit 330. Circuit 330 is preferably passive and includes the schematic representation of inductor 332 and capacitor 334 in accordance with standard technology. However, the invention is equally applicable to an active power factor correcting stage 330 to produce a first DC bus across lines 340, 342. This DC bus has a voltage generally equal to the peak voltage at lines 320. The power factor corrected preregulated DC bus at lines 340, 342 is the input to high switching speed inverter 300. By providing the high input voltage at input stage 310, high voltage, high current and high power is available at DC bus 340, 342 so that the extremely high capacity switches in inverter 300 provide a high current to output transformer 350. Primary 352 of transformer 350 has a current alternating at the switching frequency of about 40 kHz with a current is in the general range of 300 amperes. By providing the novel modular matrix transformer as described in FIGS. 11-18, the secondary stage of transformer 350 has the ability to increase the current from the primary side by a factor 3-5 times. In the preferred embodiment the current increased between the primary side or winding 352 and secondary side or network 360 is approximately three fold. Thus, an input current over 300 amperes to primary 352 produces about 1,000 amperes in secondary network or matrix transformer 360 shown as windings A1, A2 and A3 and using the modules shown in FIGS. 11-18. The duty cycle of the switch pairs in inverter 300 allows current flow in secondary network 360 between about 50 and 1,000 amperes. The duty cycle can be between 5% and 100%. The output of transformer 350 is rectified by rectifier 370 to produce a positive voltage at lead 380, and a negative voltage at lead 382 and a center ground 384. Thus, power source S converts the high input line voltage of stage 310 into a control DC voltage at lines 380, 382, with a current range of 50 amperes to about 1,000 amperes. The voltage on the DC bus 380, 382 is substantially less than the voltage on DC bus 340, 342. In practice, this voltage is less than 100 VDC. In accordance with standard welding technology, welding can be performed directly by electrode E and workpiece W across output leads 380, 382; however, in the preferred embodiment of the present invention, the power source is a high current capacity power source with the capabilities of operating in both a DC welding mode and in an AC welding mode. To accomplish this selectivity, one aspect of the present invention includes a standard polarity switch 390 driven by output DC bus 380, 382. Polarity switch 390 has the capabilities of being set at DC positive, DC negative or AC. Irrespective of the actual modes of operation selected by polarity switch 390, the waveform in the preferred embodiment of the present invention is controlled by waveform technology pioneered by The Lincoln Electric Company of Cleveland, Ohio. This type of control system includes components schematically illustrated in FIG. 1A wherein current measuring shunt 400 has output lead 402 directed to error amplifier 420 having a second input 410a from a standard waveform generator 410. Thus, the waveform and current in the welding operation being performed by power source S is controlled by the waveform profile outputted from generator 410 in accordance with its comparison to the actual current in feedback line 402. A comparator schematically illustrated as error amplifier 420 is a software component in the control system and it outputs a signal on line 422. The signal level on line 422 controls the duty cycle of the various switch pairs in inverter 300. The actual control is through pulse width modulator 430 driven by oscillator 432. The signal on output 434 is directed to controller C of inverter 300, as best shown in FIG. 1B. Of course, the feedback control can be the arc voltage, arc current or arc power of the welding process. Feedback current control, which is the most common feedback parameter, is disclosed for illustrative purposes only to show the waveform technology control in the preferred embodiment of the present invention. Controller C, pulse width modulator 430 and waveform generator 410 require a control voltage, which control voltage can be provided by a buck converter connected to the DC bus 340, 342 or other DC voltages in power source S. In the illustrated embodiment of the present invention, the control voltages, for the circuit boards used to control power source S is provided by power supply 440 driven by a single phase of the input supply 310. Power supply 440 produces a controlled voltage of about 15 VDC in line 442 to drive the various controllers used in power source S. When polarity switch is operated in the AC mode, current which may have a magnitude of 1,000 amperes is shifted between a positive polarity and a negative polarity. As disclosed in Stava U.S. Pat. No. 6,111,216, polarity switch 390 is provided with a line 450 to direct a polarity reversal signal in this line to inverter 300. When the polarity switch is to change polarity the inverter is phased down. Thus, this signal reduces the output current magnitude of inverter 300 to a low level, which level may be 0-200 amperes. Polarity switch 350 waits until the current in lines 380, 382 is reduced to a set level before an actual polarity reversal is effected. This is standard technology shown in FIGS. 9 and 10 and explained in detail in the prior Stava patent, which patent is directed to this output concept and not to a detail of the inverter itself.

In FIG. 1B, switches SW1, SW2 are operated in unison by gate lines 460, 462. They are controlled by the PWM changing the duty cycle relationship of the signals on these lines. In a like manner, switches SW3 and SW4 are operated in unison by gating signals in lines 470, 472. This is a full bridge high switching speed inverter network where the switching gates are outputted from controller C in accordance with the signal in line 434 from pulse width modulator 430. The switches operate at a frequency of about 40 kHz with a duty cycle to control the output current between about 50 amperes and 1,000 amperes. Capacitor 480 stabilizes the voltage across leads 340, 342 constituting the DC bus for inverter 300. By constructing power source S in accordance with the described implementation of the present invention, the power source can output a welding current either DC or AC having a maximum current level greater than 700 amperes and, in practice, at least about 1,000 amperes. This has never been done before in a high speed switching inverter and constitutes an advance which takes the low load inverters existing in the 1980's and converts them into high capacity industrial power sources having an output current not heretofore obtained.

Figure 3:
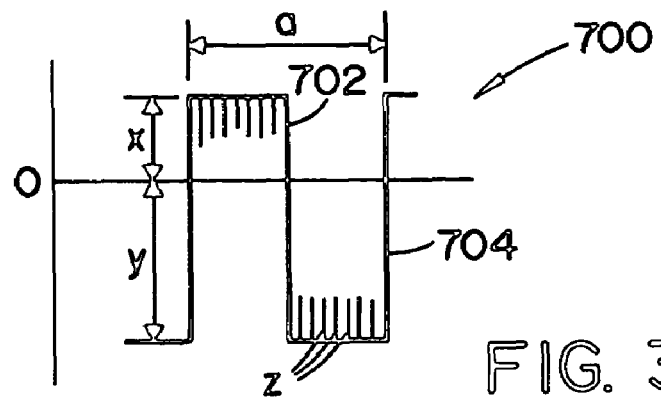
FIGS. 3-7 are current graphs of representative type current patterns and profiles obtainable by using the present invention.
Figure 4:
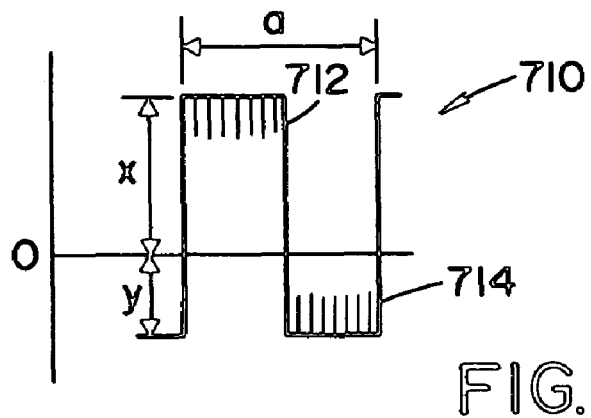
Figure 5:
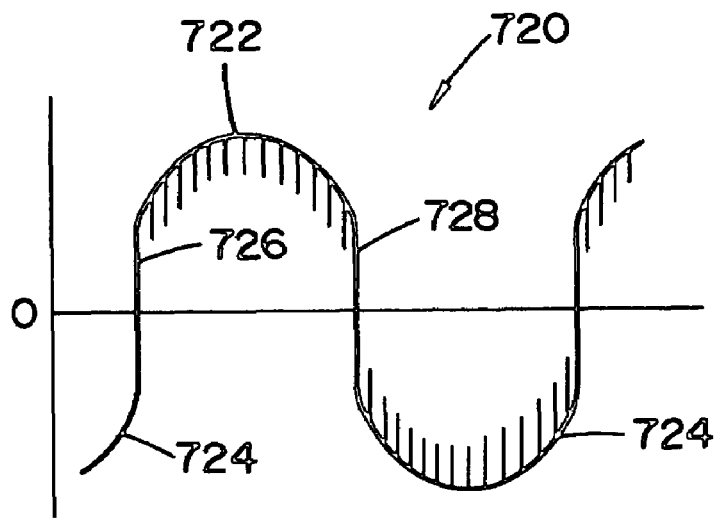
Figure 6:
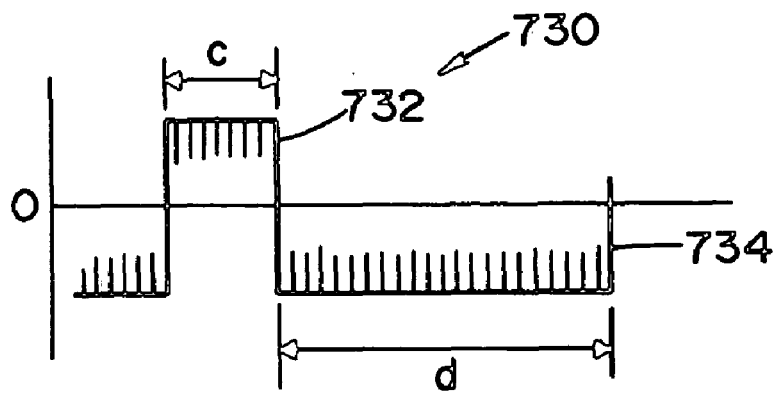
Figure 7:
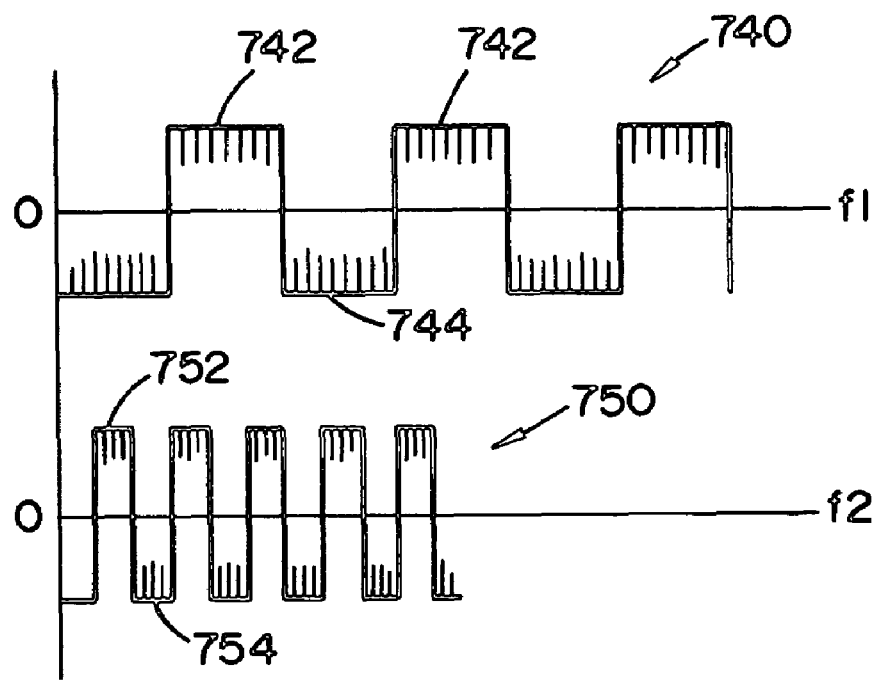
Figure 9:
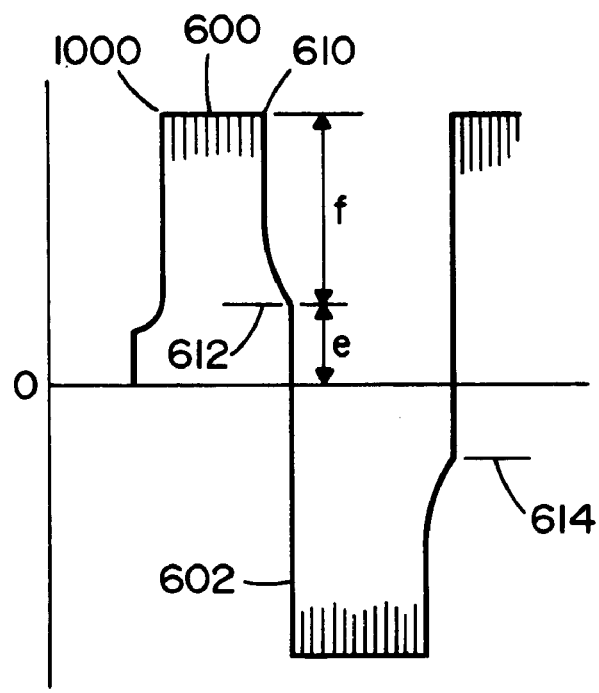
FIG. 9 is a current graph illustrating an aspect of the invention employing the technology disclosed and claimed in Stava U.S. Pat. No. 6,111,216.
Figure 10:
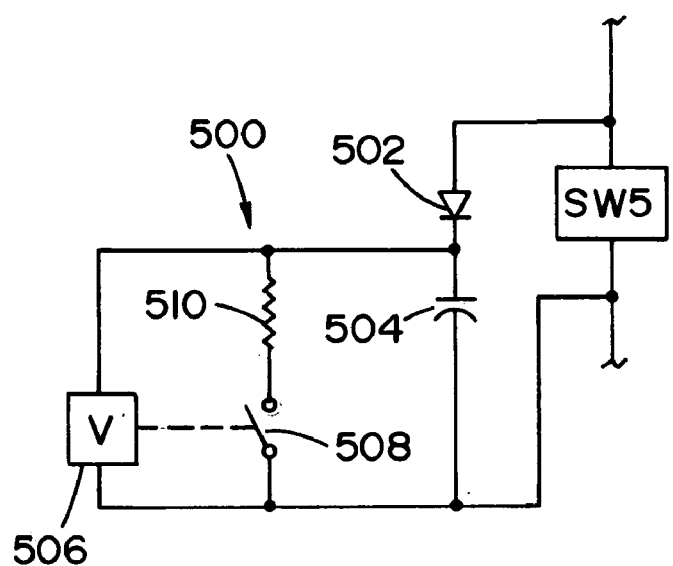
FIG. 10 is a wiring diagram illustrating a modification of the preferred embodiment of the invention to adjust the level of the polarity reversal current as schematically illustrated in FIG. 9.
Figure 11:
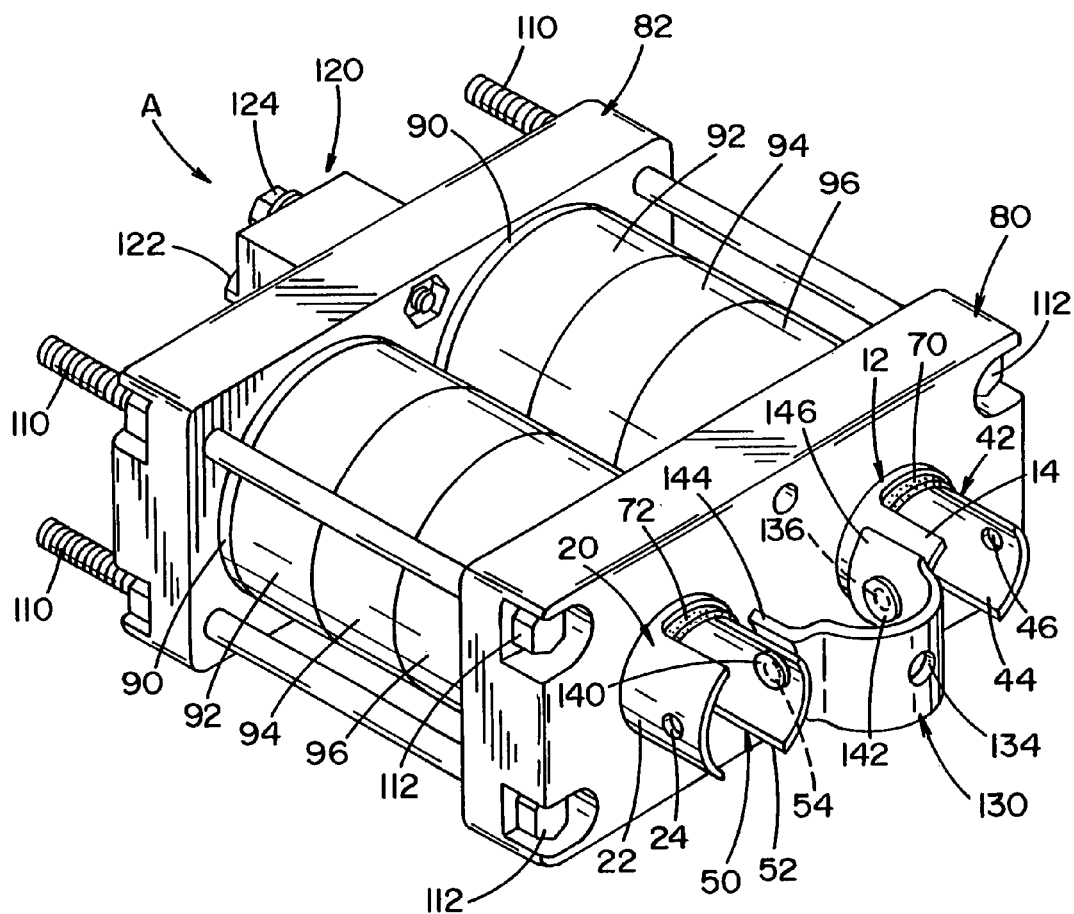
FIG. 11 is a pictorial view of a module used in the preferred embodiment of the present invention.

FIGS. 9 and 10 show a slight modification of the preferred embodiment of the invention where an active snubber 500 is connected across each of the switches in polarity switch 390. Since these snubbers are identical, only the snubber across polarity switch SW5 is illustrated in FIG. 10. In accordance with standard practice, diode 502 is connected in series with capacitor 504. The capacitor is the voltage across switch SW5. This voltage across the capacitor is sensed by detector 506 that controls switch 508. When the voltage of capacitor 504 progresses to a given level, it is discharged through resistor 510 by closing switch 508. In FIG. 9 pulses 600, 602 are pulses representing AC operation of polarity switch 390. When there is a signal in line 450 indicating that polarity is to be reversed, inverter 300 is turned down or off at point 610. The current then decays until it reaches a given set current level 612. At that time, the current is actually reversed. If the output current is at 1,000 amperes, the current 612 may be 300 amperes. Thus, the current decreases by the amount f and switching occurs only at a current having a magnitude represented as level e. This is the implementation of the system disclosed in Stava U.S. Pat. No. 6,111,216 when there was no welding power source to create more than about 500-600 amperes of welding current. By using snubbing circuit 500, current reversal level 612 is adjustable. The reversal level is low when there is no snubber across the switches in polarity switch 390. By using active snubber 500, the switching point current 612 in positive pulse 600 and the switching point current 614 in negative pulse 602 can be adjusted to a higher level. Since the output of power source S is operated at variable frequencies, the switches in polarity switch 390 may include snubbers, they may include an active snubber circuit 500 or they may use no snubbers. The selection of the snubbing routine determines the reversal current points 612, 614 at which current reversal is actually performed by polarity switch 390. The disclosure of FIGS. 9 and 10 is not essential to the present invention but is used in practicing the invention. The same is true of the many welding waveforms of generator 410. FIGS. 3-7 show various types of AC waveforms that can be generated by waveform technology using waveform generator 410. In FIG. 3, AC MIG waveform 700 has a period a and includes a positive portion 702 and a negative portion 704. The amplitude or magnitude of portion 702 is x. The negative amplitude is y. In this example, a higher negative amperage is provided by waveform 700. The opposite is true of waveform 710 shown in FIG. 4 wherein magnitude x for positive portion 712 is greater than magnitude y of negative portion 714. Each of the positive and negative portions are formed by a plurality of small current pulses z in accordance with the normal characteristic of pulse width modulating the output of inverter 300 by using waveform technology under the control of waveform generator 410. If the current is to duplicate a sine wave, this can be done by using waveform technology as employed in the preferred embodiment of the invention. Such performance is illustrated in FIG. 5 where waveform 720 has a positive sinusoidal portion 722 and a negative sinusoidal portion 724. Due to the need to reverse polarity between the positive portion and negative portion of waveform 720 by switch 390, the waveform normally includes generally vertical transition portions 726, 728 which are the current reversal points shown in FIG. 9. The duty cycle of the AC welding waveform can be changed as shown in FIG. 6, where waveform 730 includes positive portion 732 and negative portion 734 having the same general amplitude, but with a different timing or duty cycle. Portion 732 has a time length c and portion 734 has a time length d. Variations in the amplitude and duty cycle together with variations in the actual profile of the waveforms, have been described. FIG. 7 shows waveform 740, 750 comprising positive portions 742, 752 and negative portions 744, 754. Waveform 740 has a low frequency f1 and waveform 750 has a high frequency f2. FIGS. 3-7 are representative of the many AC waveforms which can be implemented by the preferred control arrangement used in power source S. When DC welding is to be performed, the waveform profile can be controlled by waveform generator 410 in accordance with standard control technology. FIGS. 3-7 and FIGS. 9-10 relate to operating components and slight modifications of the preferred embodiment of the invention and do not form limitations to the implementation of the invention.

Figure 2:
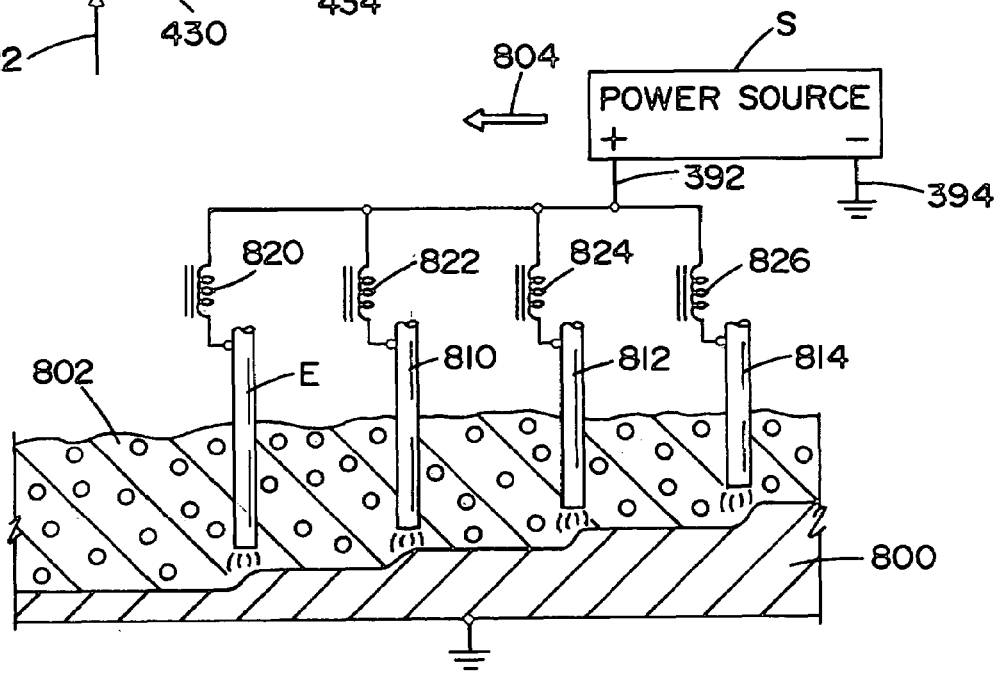
FIG. 2 is a schematic diagram of the present invention used for submerged arc welding illustrating an additional advantage of using the present invention.
Figure 8:
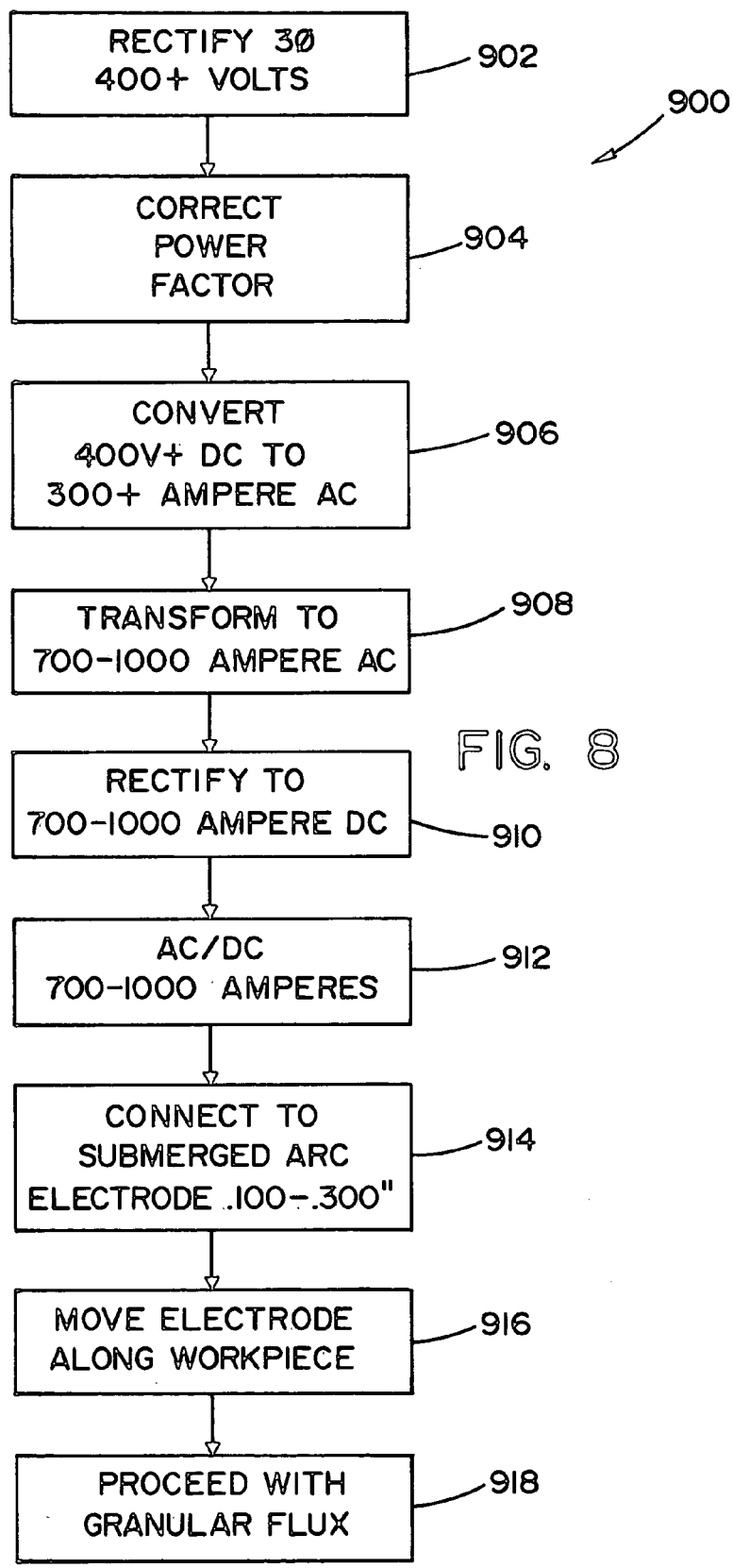
FIG. 8 is a flow chart of the method of using the preferred embodiment of the present invention for submerged arc welding.

The invention is primarily applicable to welding with a large diameter electrode wire, such as a wire with a diameter in the range of 0.090-0.300 inches, such as submerged arc welding where the current at each welding operation has a magnitude in the general range of greater than 650 amperes. Power source S can be applied to each electrode when several electrodes are used in tandem to perform a welding operation, especially when welding for heavy fabrication. The concept of using the invention for submerged arc welding is schematically illustrated in FIGS. 2 and 8 where the basic electrode is single electrode E. In FIG. 2, workpiece 800 is a pipe joint being welded using deposited flux bed 802 and electrode E connected to output terminal 392 of power source S. The joint may be a seam or end welded in a pipe mill. By moving the workpiece 800 with respect to power sources as indicated by arrow 804, electrode E is melted to deposit molten metal onto the moving workpiece. This is standard submerged arc technology. Of course, in some situations welding of pipe is done in the field where more than one electrode is used as an AC MIG process.

Since power source S has a capacity of approximately 1,000 amperes, a natural occurring feature of the invention is schematically illustrated in FIG. 2 where each electrode requires a current less than about 300 amperes. Three electrodes 810, 812, 814 in addition to electrode E are shown. It has been found that the stiff nature of power source S can drive four electrodes, each having a welding current of about 200 amperes by using series inductors 820, 822, 824 and 826. Thus, when one electrode shorts against workpiece 800, the other electrodes continue to weld. Operation of several electrodes by one power source is made possible by the high current capacity of power source S. This capacity allows storage of energy in the inductors so one short circuit will not drain all current from the other electrodes. The schematic illustration of several inductors in FIG. 2 is to describe an advantage of having a high capacity power source S. Power source S is preferably used with a single electrode E; however, multiple electrode welding can be performed with power source S. This is especially helpful for MIG welding whether AC or DC. The invention is used for single electrode E in pipe mills and multiple electrodes, in pipe mills or in the field.

The method of submerged arc welding using power source S is shown as flow chart 900 in FIG. 8. In accordance with the preferred method of the present invention, a three phase line voltage of over 400 volts AC is rectified as indicated by block 902. The rectified output of block 904 is power factor corrected, either with an active or preferably a passive power factor, as indicated by block 904. The DC output of the power factor correcting circuit 904 is converted to an AC signal having a current rating of over 300 amperes as indicated by block 906. This high current is transformed into a secondary AC signal having a current increased to a level greater than 700 amperes and generally in the range of 1,000 amperes. To accomplish this objective, the transformer ratio is between 3:1 to 4:1. The high current from the transforming operation shown as block 908 is rectified as indicated by block 910 to produce a DC bus which is directed to a polarity switch causing either AC or DC welding current. This current has a magnitude up to about 1,000 amperes as represented by block 912. This high welding current is connected to a submerged arc electrode E as shown in FIG. 2. The electrode has a diameter in the general range of 0.090 to 0.300 inches. This is represented by block 914. The invention is, thus, generally applicable to welding with an electrode having a diameter greater than about 0.100 inches. Thereafter, the electrode driven by the high current power source is moved along the workpiece as indicated by block 916 together with granulated flux 802, as represented by block 918. In this manner, a single inverter is used to perform submerged arc welding. There is not a need for combining two separate inverter power sources to create the current necessary for the submerged arc welding process.

Conversion of the high switching speed inverter of the past into a power source having an output welding current greater than 700 amperes and generally in the range of 1,000 amperes has been made possible by the use of a modular construction of the matrix secondary 360 of power source S as shown in FIG. 1. Thus, the output secondary windings are divided into several sections A1, A2 and A3 as schematically illustrated in FIG. 1B. The secondary side of transformer 350 is constructed by using a plurality of modules A, as described and explained in FIGS. 11-18. Several modules A are used in a matrix transformer where primary winding is interleaved through two or more modules A. Each of the modules is the same and will be described as a module and as combined for use in the output of transformer 350.

Figure 12:
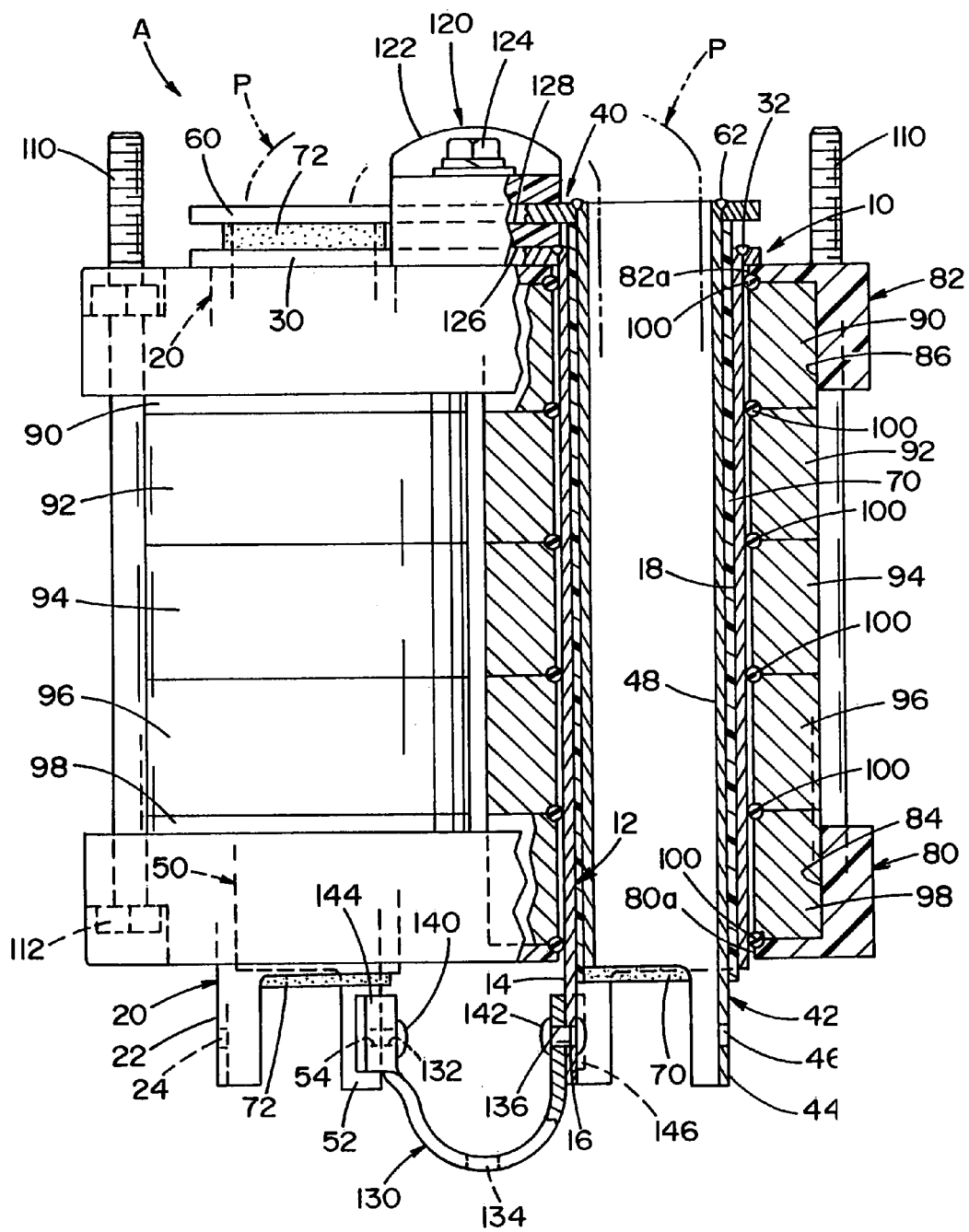
FIG. 12 is a side elevational view of the module of FIG. 11 showing in partial cross-section one side of the concentric tube construction.

Module A is formed from a first assembly 10 with a first tube 12 terminating in a lower tab 14 having a connector hole 16. Central passage 18 in tube 12 is used as the primary winding passage when module A includes only the first assembly 10. As will be explained, the preferred embodiment has two assemblies formed by telescoping two coaxial conductive tubes usually formed from copper and telescoped around each other. Second tube 20 of first assembly 10 includes a terminal tab 22 with a lower connector hole 24 and has a central cylindrical passage 26. To fix tube 12 with respect to tube 20, so the tubes are in parallel and in spaced relationship, a first jumper strap 30 is provided. Two space holes in strap 30 surround the first end of tubes 10, 20 so weld joints 32 fix the tubes into the holes. As so far described, the jumper strap is at one end of the tubes and the tubes are parallel and spaced with the second ends having protruding tabs 16, 22, respectively. As will be explained later, only assembly 10 may be used; however, the preferred embodiment involves a coaxial relationship involving a second assembly 40 essentially the same as assembly 10 with tubes having lesser diameter so that they telescope into tubes 12, 20. Assembly 40 includes third tube 42 having a lower tab 44 with a connector hole 46 and a central passage 48 to accommodate winding P. A fourth tube 50 has a lower tab 52 with a connector hole 54 so that the third and fourth tube can be joined by a second jumper strap 60 provided with spaced openings surrounding the top or first end of tubes 42, 50. Weld joint 62 around the tubes joins the tubes into the holes of jumper strap 60. This second assembly is quite similar to the first assembly except the diameters of tubes 42, 50 are substantially less than the diameters of tubes 12, 20. In the cylindrical gap between the tubes, a Nomex insulator sleeve or cylinder 70, 72 is provided. These cylindrical insulator sleeves electrically isolate the coaxial tubes forming the basic components of module A. Plastic end caps 80, 82 are provided with two transversely spaced recesses 84 in cap 80 and two spaced recesses 86 in cap 82. Only one of the recesses 84, 86 is illustrated in FIG. 12. The other recesses are the same and need not be illustrated. The construction of the left coaxial assembly of module A is essentially the same as the construction of the right coaxial assembly as shown in cross-section in FIG. 12. As illustrated, between cap recesses 84, 86 there are provided a plurality of ferrite donut-shaped rings or magnetic cores 90-98. To center the cores there are provided a number of silicon washers 100 so bolts 110 having heads 112 clamp the end caps together. This action holds the spaced rings around the coaxial tubes of module A. Assemblies 10, 40 with the coaxial tubes are held onto module A by an upper plastic nose 120 having an arcuate primary winding guide 122. The nose is held onto end plate 82 by transversely spaced bolts 124. Nose 120 includes laterally spaced slots 126, 128 so that the nose can be moved from one edge of assemblies 10, 40 to the center position by riding on spaced jumper straps 30, 60. When in the center of the module, the plastic nose is bolted to end cap 82. This clamps assemblies 10, 40 onto module A in the position shown in FIG. 12 and holds straps 30, 60 in spaced relationship. The coaxial tubes are aligned by holes 80*a*, 82*a* concentric with cylindrical recesses 84, 86 in end caps 80, 82, respectively. Two of these holes are located in each of the end caps. Washers 100 center the coaxial tubes in the cylinder formed by core rings 90-98.

Figure 13:
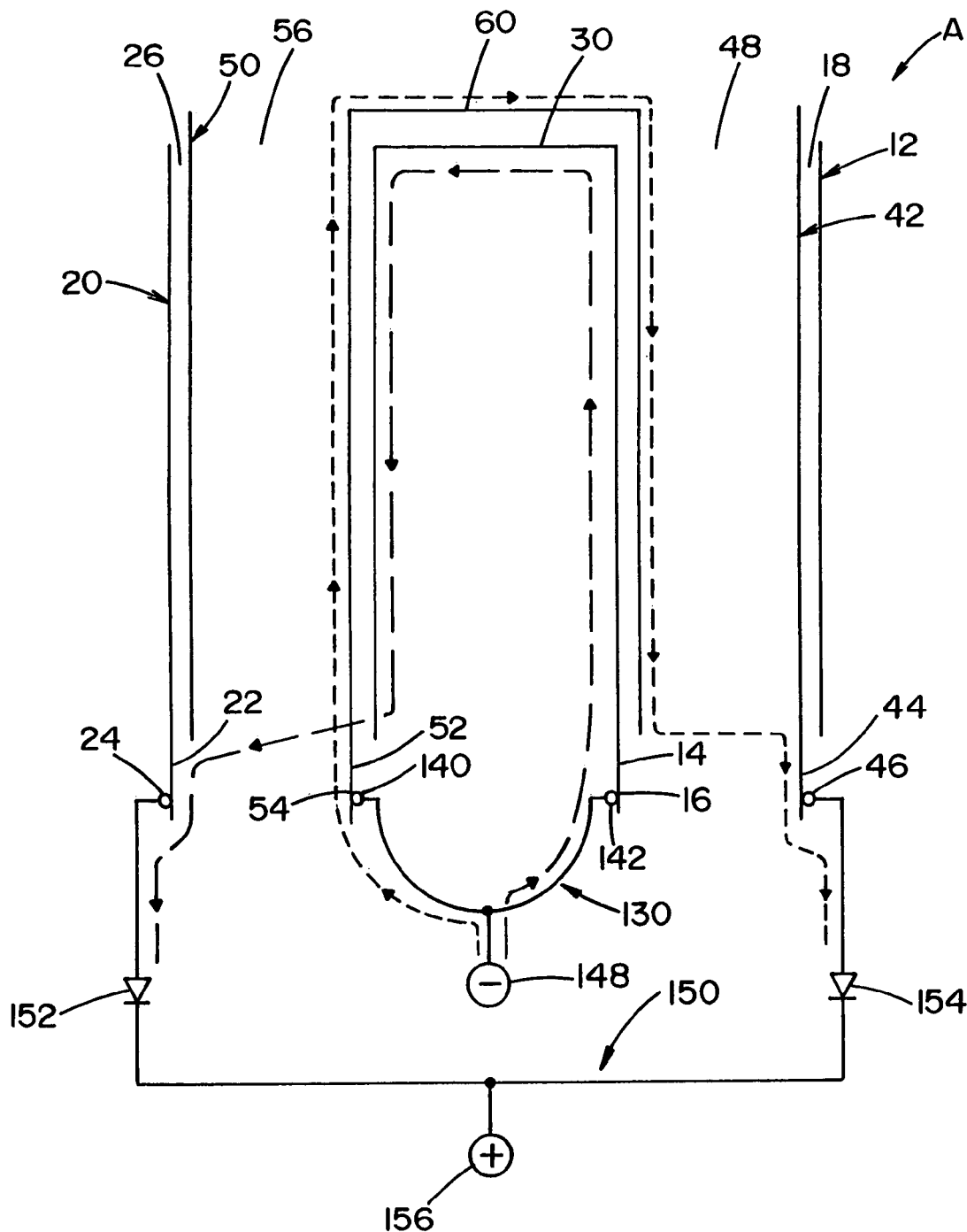
FIG. 13 is a schematic wiring diagram illustrating the current flow in a module as shown in FIGS. 11 and 12.
Figure 14:
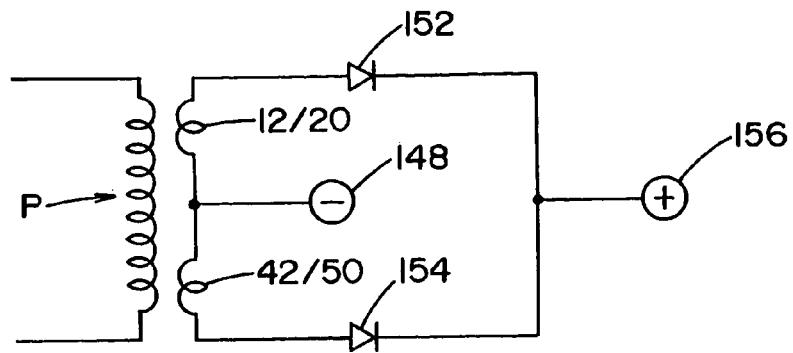
FIG. 14 is a wiring diagram of the module shown in FIGS. 11-13 in conjunction with a single primary winding interleaved through the passages of the parallel concentric tube module.

Module A is connected as a secondary for a high frequency transformer driven by a primary from an inverter. This electrical arrangement involves connecting assemblies 10, 40 in series by a center tap connector 130 having holes 132, 134 and 136. A rivet 140 connects hole 132 with tab 52, while rivet 142 connects hole 136 with tab 14. To stabilize center tap 130, the ends of the tap are provided with cylindrical wings 144, 146, best shown in FIG. 12. As shown in FIG. 13, module A is connected to rectifier 150 having diodes 152, 154 and an output terminal 156. By this arrangement, the single coaxial module allows primary winding or windings P to be leaved through cylindrical passages 48, 56 so the module is a secondary of a high frequency transformer. This is a normal use of the present invention when employed for an electric arc welder. A simplified wiring diagram of the embodiment is illustrated in FIG. 14 to show primary winding P and secondary windings 12/20 and 42/50.

Figure 15:
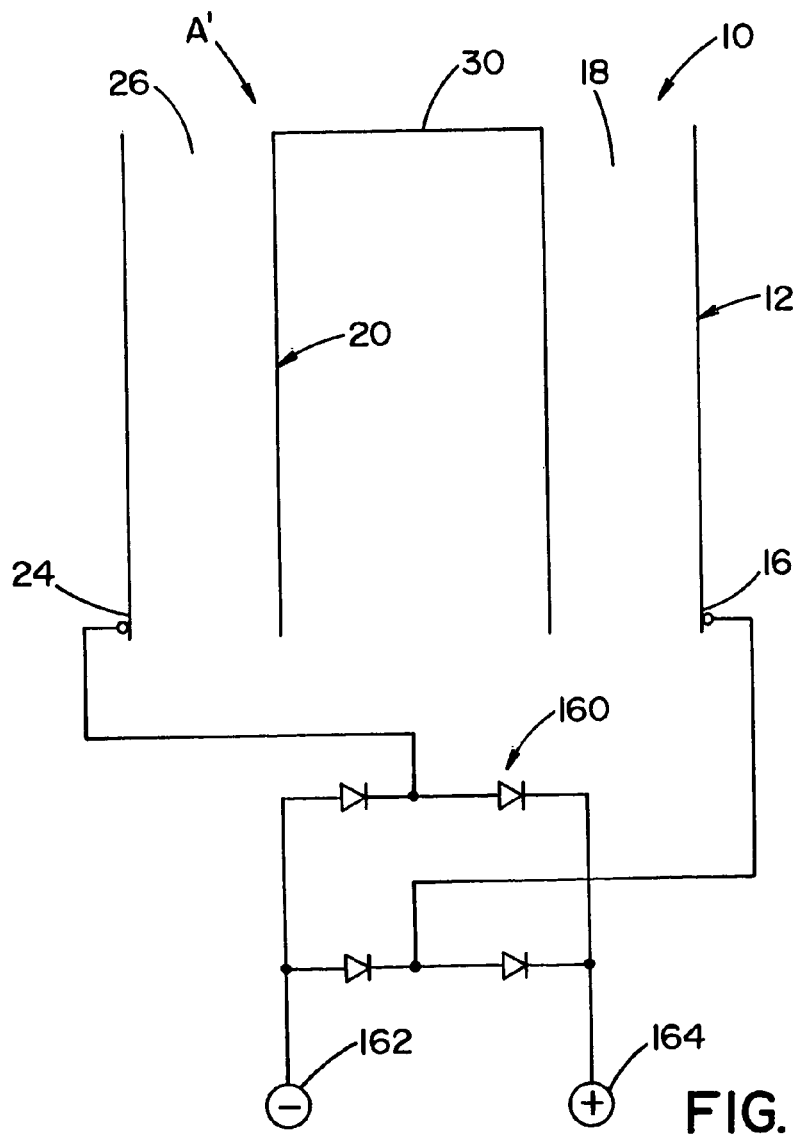
FIG. 15 is a schematic wiring diagram similar to FIG. 13 illustrating a modified module utilizing two parallel tubes with a full wave output rectifier.

In accordance with a modification of module A, module A' shown in FIG. 15 includes only tube assembly 10 with only conductive tubes 12, 20 that define terminal ends 16, 24. These terminals are connected across a full wave rectifier 160 having output terminals 162, 164. Tubes 12, 20 could be a single tube; however, in the invention two tubes are used to minimize inductance so the primary winding from the inverter is leaved around jumper 30 through center winding accommodating openings 18, 26.

Figure 16:
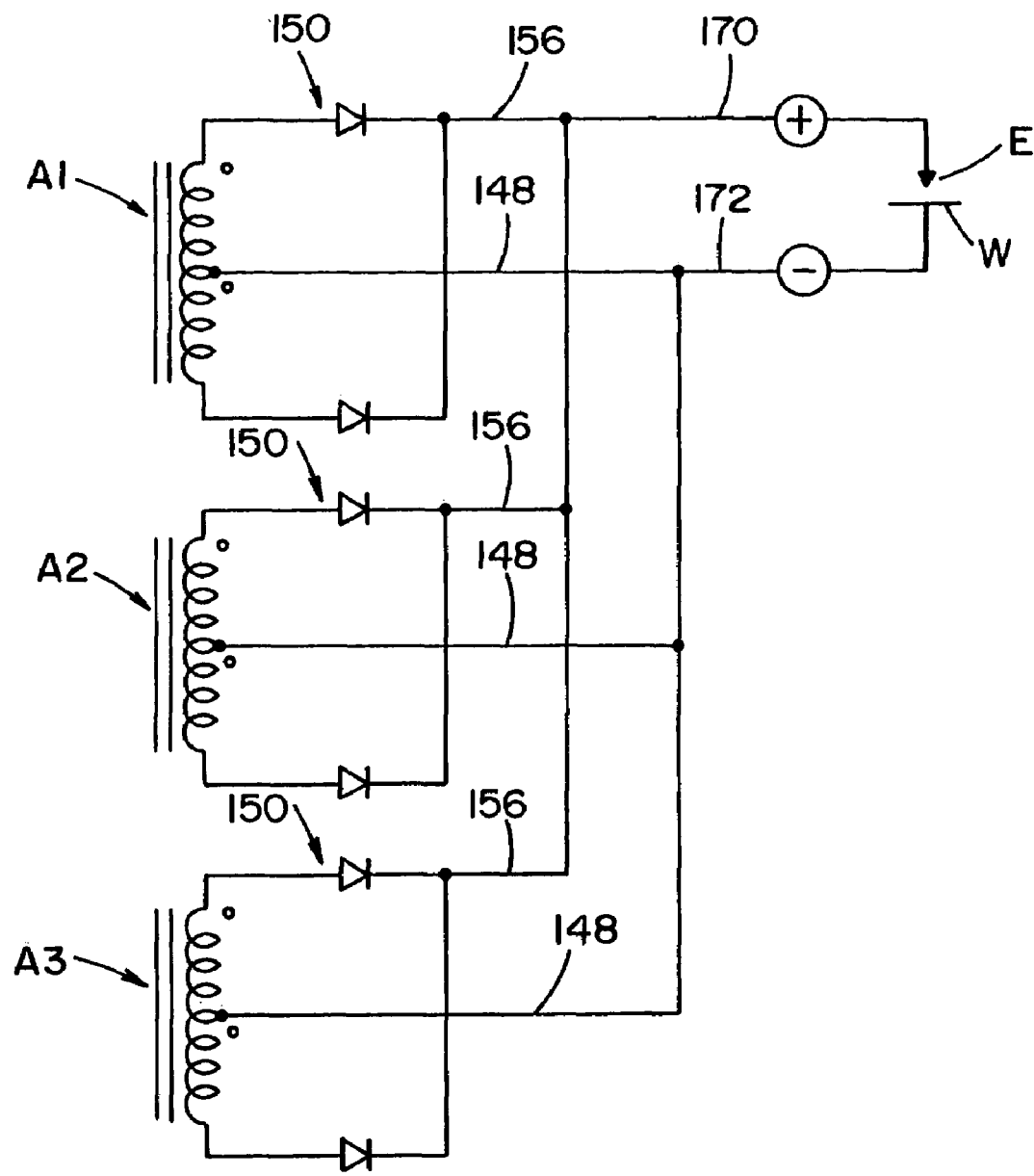
FIG. 16 is a wiring diagram showing three modules as illustrated in FIGS. 11-13 connected as the output of the power transformer of the power source for an electric arc welder.
Figure 17:
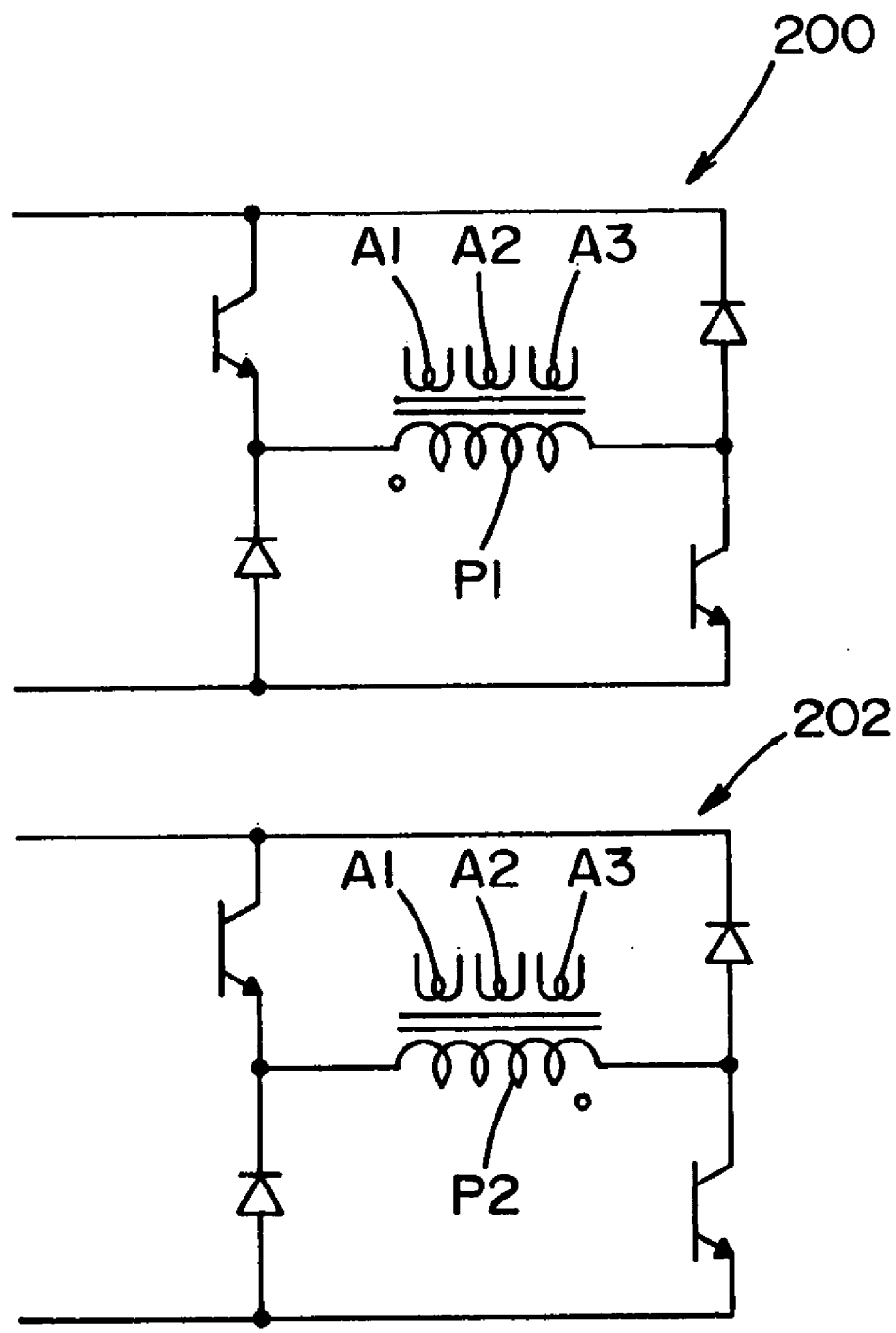
FIG. 17 is a schematic wiring diagram of the high switching speed inverter used for the primary winding and/or windings that are interleaved in the modules schematically represented in FIG. 16 and shown in detail in FIGS. 11-13 and in FIG. 18; and, FIG. 18 is a pictorial view of three modules connected as shown in FIG. 16 utilizing a plurality of modules as disclosed in FIGS. 11-13 and usable in the power source of FIG. 1.
Figure 18:
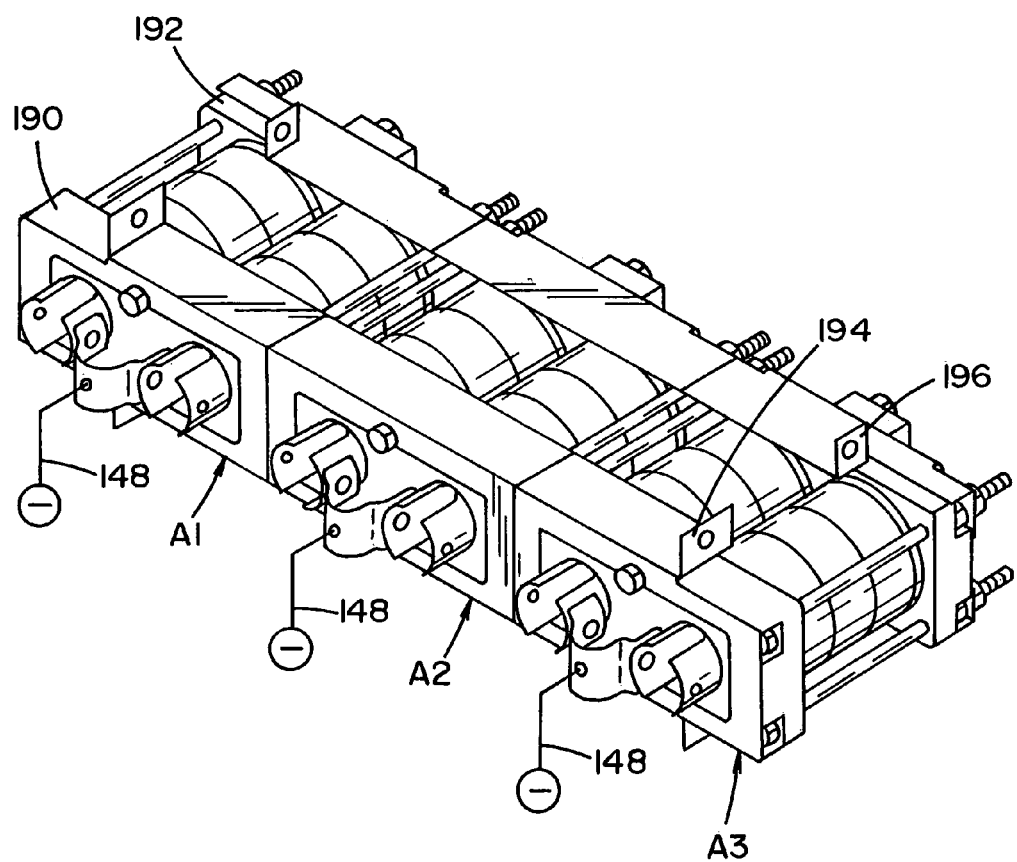

A plurality of modules A are arranged to provide a high frequency transformer for a welder represented by electrode E and workpiece W in FIG. 16. This matrix transformer concept used in power source S is illustrated schematically in FIGS. 16-18 wherein modules A1, A2 and A3 are joined together by end straps 190, 192 in one end of the multiple module assembly shown in FIG. 18 and end straps 194, 196 on the other end. Bolts clamp a frame around modules A1, A2 and A3 to assemble them into alignment, as shown in FIG. 18 wherein each set of passages 48, 56 is in parallel and are aligned in side-by-side relationship. The wiring diagram for the assembly shown in FIG. 18 is illustrated in FIG. 16 wherein terminals 156 are connected in parallel at terminal 170 and center tap 148 is connected in parallel at terminal 172. The primary windings from one or more inverters are shown schematically in the wiring diagram of FIG. 17. Inverter 200 creates an AC current in primary P1. In a like manner, inverter 202 provides an AC current in primary P2. These two primaries are interleaved together through modules A1, A2 and A3. In practice, two primary windings are used in the matrix transformer of FIG. 18; however, a single winding is also used in this type of matrix transformer. FIGS. 16-18 merely illustrate that the coaxial secondary transformer module A of FIGS. 11-13 can either be used as a single secondary winding or as parallel secondary windings in a matrix transformer. Other arrangements use module A as a secondary winding for a transformer 350 between inverter 300 and a polarity switch 390. The tubular, coaxial conductors disclosed in module A can be replaced by an elongated ribbon helix around the center axis of the individual tubes. Such helix configuration still provides the coaxial relationship between the concentric tubes. The term "tube" defines a continuous tube conductor, as so far described, or the helix tube as used in the alternative embodiment.

By using the novel coaxial modules in secondary 360 of transformer 350, it is possible to increase the current rating of the switches SW1-SW4 to a level of about 300 amperes. Thus, the output of inverter 300 has a rated current at the full on condition as directed by pulse width modulator 430. This produces 350 amperes in primary winding 352. With a turn ratio of 3:1 to 4:1 obtained by the use of the coaxial matrix transformer, the output current for welding reaches about 1,000 amperes. This has never been done in the welding industry and converts the normal low power inverter based power source into a completely new type of industrial power source capable of driving a 1,000 current submerged arc welding method. The preferred embodiment is controlled by a pulse width modulator adjusting the duty cycle. As an alternative the control can be by a pulse width modulator adjusting the phase shift as is done in some welding inverters.

The invention claimed is:

1. A power source for electric arc welding, said power source including a single high switching speed inverter for driving the primary side of an output transformer, said output transformer having a primary circuit with a primary current greater than 250 amperes and a secondary circuit with a current having an operating range with a maximum current greater than 700 amperes and an output rectifier to rectify said secondary current into a DC current suitable for welding;
   wherein said secondary circuit includes a plurality of separate winding modules, each with a given current capacity, and connected in parallel with the total output welding current being the sum of the currents of said separate winding modules.

2. A power source for electric arc welding, said power source including a high switching speed inverter for driving the primary side of an output transformer, said output transformer having a primary circuit with current greater than 250 amperes and a secondary circuit with a current having an operating range with a maximum current greater than 700 amperes and an output rectifier to rectify said secondary current into a DC current suitable for welding;
   wherein said secondary circuit includes a number of separate winding modules, each with a given current capacity, and connected in parallel with the total output welding current being the sum of the currents of said separate winding modules; and
   wherein each of said modules comprises a first conductive tube with first and second ends; a generally parallel closely adjacent second conductive tube with first and second ends, said tube having a central elongated passage for accommodating one or more primary windings of said primary circuit; a magnetic core surrounding each of said tubes; a jumper strap joining said first ends of said tubes; and, a circuit forming connector at said second ends of said tubes.

3. A power source as defined in claim 2 wherein each of said magnetic cores each comprise a plurality of doughnut-shaped rings around one of said tubes.

4. A power source as defined in claim 3 including a nose piece over said jumper strap with a guide surface between said central passages of said parallel tubes.

5. A power source as defined in claim 4 wherein said jumper strap is a center tap.

6. A power source as defined in claim 3 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages for accommodating said primary winding or windings of said primary circuit with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

7. A power source as defined in claim 6, wherein said second end of one of said first and second tubes and one end of one of said third and fourth tubes are connected to a rectifier.

8. A power source as defined in claim 6 including an insulator between said jumper straps.

9. A power source as defined in claim 3 wherein said jumper strap is a center tap.

10. A power source as defined in claim 2 including a nose piece over said jumper strap with a guide surface between said central passages of said parallel tubes.

11. A power source as defined in claim 10 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages for accommodating said primary winding or windings of said primary circuit with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

12. A power source as defined in claim 11 wherein said second end of one of said first and second tubes and one end of one of said third and fourth tubes are connected to a rectifier.

13. A power source as defined in claim 11 including an insulator between said jumper straps.

14. A power source as defined in claim 10 wherein said jumper strap is a center tap.

15. A power source as defined in claim 2 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages for accommodating said primary winding or windings of said primary circuit with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

16. A power source as defined in claim 15 wherein said second end of one of said first and second tubes and one end of one of said third and fourth tubes are connected to a rectifier.

17. A power source as defined in claim 15 including an insulator between said jumper straps.

18. A power source as defined in claim 2 wherein said jumper strap is a center tap.

19. A power source as defined in claim 2 wherein said high switching speed inverter is operated at a frequency of over 20 kHz.

20. A power source as defined in claim 2 including a three phase input power supply with a voltage over about 400 VAC.

21. A power source as defined in claim 20 including a power factor correcting circuit between said input power supply and said inverter.

22. A power source as defined in claim 21 wherein said power factor correcting circuit is a passive circuit.

23. A power source as defined in claim 22 wherein said inverter is controlled by a pulse width modulator.

24. A power source as defined in claim 23 wherein said pulse width modulator controls the phase shift of said inverter.

25. A power source as defined in claim 24 wherein said pulse width modulator is driven by a waveform generator.

26. A power source as defined in claim 23 wherein said pulse width modulator is driven by a waveform generator.

27. A power source as defined in claim 21 wherein said inverter is controlled by a pulse width modulator.

28. A power source as defined in claim 27 wherein said pulse width modulator controls the phase shift of said inverter.

29. A power source as defined in claim 28 wherein said pulse width modulator is driven by a waveform generator.

30. A power source as defined in claim 27 wherein said pulse width modulator is driven by a waveform generator.

31. A power source as defined in claim 20 wherein said inverter is controlled by a pulse width modulator.

32. A power source as defined in claim 31 wherein said pulse width modulator controls the phase shift of said inverter.

33. A power source as defined in claim 32 wherein said pulse width modulator is driven by a waveform generator.

34. A power source as defined in claim 31 wherein said pulse width modulator is driven by a waveform generator.

35. A power source as defined in claim 2 wherein said inverter is controlled by a pulse width modulator.

36. A power source as defined in claim 35 wherein said pulse width modulator controls the phase shift of said inverter.

37. A power source as defined in claim 36 wherein said pulse width modulator is driven by a waveform generator.

38. A power source as defined in claim 35 wherein said pulse width modulator is driven by a waveform generator.

39. A power source as defined in claim 35 wherein said power source is connected to a submerged arc electrode and a traveling device to move said electrode relative to the workpiece being welded.

40. A power source for electric arc welding, said power source including a high switching speed inverter for driving the primary side of an output transformer, said output transformer having a primary circuit with current greater than 250 amperes and a secondary circuit with a current having an operating range with a maximum current greater than 700 amperes and an output rectifier to rectify said secondary current into a DC current suitable for welding;

wherein said secondary circuit includes a plurality of separate winding modules, each with a given current capacity, and connected in parallel with the total output welding current being the sum of the currents of said separate winding modules;

wherein each of said modules comprises a first coaxial set of concentric, telescoped conductive tubes separated by a tubular insulator; a second coaxial set of concentric, telescoped conductive tubes separated by a tubular insulator; a magnetic core around each of said sets, said sets each having an elongated central passage for accommodating at least one primary winding of said primary circuit, and conductor connecting said tubes of said sets into a series circuit.

41. A power source as defined in claim 40 wherein said high switching speed inverter is operated at a frequency of over 20 kHz.

42. A power source as defined in claim 41 wherein said power source is connected to a submerged arc electrode and a traveling device to move said electrode relative to the workpiece being welded.

43. A power source as defined in claim 40 including a three phase input power supply with a voltage over about 400 VAC.

44. A power source as defined in claim 43 including a power factor correcting circuit between said input power supply and said inverter.

45. A power source as defined in claim 44 wherein said power factor correcting circuit is a passive circuit.

46. A power source as defined in claim 45 wherein said inverter is controlled by a pulse width modulator.

47. A power source as defined in claim 46 wherein said pulse width modulator controls the phase shift of said inverter.

48. A power source as defined in claim 47 wherein said pulse width modulator is driven by a waveform generator.

49. A power source as defined in claim 46 wherein said pulse width modulator is driven by a waveform generator.

50. A power source as defined in claim 44 wherein said inverter is controlled by a pulse width modulator.

51. A power source as defined in claim 50 wherein said pulse width modulator controls the phase shift of said inverter.

52. A power source as defined in claim 51 wherein said pulse width modulator is driven by a waveform generator.

53. A power source as defined in claim 50 wherein said pulse width modulator is driven by a waveform generator.

54. A power source as defined in claim 43 wherein said inverter is controlled by a pulse width modulator.

55. A power source as defined in claim 54 wherein said pulse width modulator controls the phase shift of said inverter.

56. A power source as defined in claim 55 wherein said pulse width modulator is driven by a waveform generator.

57. A power source as defined in claim 54 wherein said pulse width modulator is driven by a waveform generator.

58. A power source as defined in claim 43 wherein said power source is connected to a submerged arc electrode and a traveling device to move said electrode relative to the workpiece being welded.

59. A power source as defined in claim 40 wherein said inverter is controlled by a pulse width modulator.

60. A power source as defined in claim 59 wherein said pulse width modulator controls the phase shift of said inverter.

61. A power source as defined in claim 60 wherein said pulse width modulator is driven by a waveform generator.

62. A power source as defined in claim 59 wherein said pulse width modulator is driven by a waveform generator.

63. A power source as defined in claim 59 wherein said power source is connected to a submerged arc electrode and a traveling device to move said electrode relative to the workpiece being welded.

64. A power source for electric arc welding, said power source comprising a high speed switching inverter coupled with an output transformer, said output transformer comprising a primary network driven by said inverter and a secondary circuit including a plurality of secondary windings magnetically coupled with said primary network, said secondary windings being electrically connected in parallel to provide a secondary output current suitable for welding with a maximum level greater than 700 amperes;

wherein said secondary circuit includes a plurality of separate winding modules, each with a given current capacity, and connected in parallel with the total output welding current being the sum of the currents of said separate winding modules;

wherein said modules individually comprise: a first conductive tube with first and second ends; a generally parallel closely adjacent second conductive tube with first and second ends, said tube having a central elongated passage for accommodating one or more primary windings of said primary circuit; a magnetic core surrounding each of said tubes; a jumper strap joining said first ends of said tubes; and a circuit forming connector at said second ends of said tubes.

65. A power source as defined in claim 64 wherein said inverter is controlled by a pulse width modulator.

66. A power source as defined in claim 65 wherein said pulse width modulator controls the phase shift of said inverter.

67. A power source as defined in claim 66 wherein said pulse width modulator is driven by a waveform generator.

68. A power source as defined in claim 65 wherein said pulse width modulator is driven by a waveform generator.

69. A power source as defined in claim 64, wherein said DC current is directed to a polarity switch operated in DC mode and/or AC mode.

70. A power source as defined in claim 69, wherein said polarity switch includes a circuit to create a polarity reversal signal when there is to be a polarity reversal during AC welding, connecting said polarity reversal signal to said inverter and a circuit to reduce the primary current of said transformer in response to said polarity reversal signal.

71. A power source as defined in claim 64 wherein said power source is connected to a submerged arc electrode and a traveling device to move said electrode relative to the workpiece being welded.

72. A power source as defined in claim 64, wherein said primary network is a single primary winding driven by said inverter.

73. A power source as defined in claim 64, wherein said primary network is two primary windings driven by said inverter.

74. A power source as defined in claim 64, said secondary windings being electrically coupled in parallel to provide a secondary output current suitable for welding with a maximum level greater than 1,000 amperes.

75. A power source as defined in claim 64, including an output rectifier to rectify said secondary current into a DC current suitable for welding.

76. A power source as defined in claim 64 wherein each of said magnetic cores each comprise a plurality of doughnut-shaped rings around one of said tubes.

77. A power source as defined in claim 64 including a nose piece over said jumper strap with a guide surface between said central passages of said parallel tubes.

78. A power source as defined in claim 77 including a conductive assembly comprising a third conductive tube with first and second ends, a fourth conductive tube with first and second ends and a second jumper strap joining said first ends of said third and fourth tubes into a parallel relationship to each other and to said first and second tubes; said third and fourth parallel tubes being telescoped into said passages of said first and second tubes, respectively, and having elongated passages for accommodating said primary winding or windings of said primary circuit with said first and second jumper strap spaced from each other; a first tubular insulator between said first and third tubes; a second tubular insulator between said second and fourth tubes; and a center tap connector joining said conductive assembly to a second end of one of said first and second tubes to form said tubes into a series circuit.

79. A power source as defined in claim 78 wherein said second end of one of said first and second tubes and one end of one of said third and fourth tubes are connected to a rectifier.

80. A power source as defined in claim 77 wherein said second end of one of said first and second tubes and one end of one of said third and fourth tubes are connected to a rectifier.

81. A power source as defined in claim 77 wherein said jumper strap is a center tap.

* * * * *